United States Patent
Hsu et al.

(10) Patent No.: US 11,006,450 B2
(45) Date of Patent: May 11, 2021

(54) METHOD OF ALLOCATING PROTECTION DURATION OF RADIO SUBSYSTEM TO INTRA-BSS STATIONS USING FRAMES WITH NETWORK ALLOCATION VECTOR

(71) Applicant: MEDIATEK INC., Hsin-Chu (TW)

(72) Inventors: Tsai-Yuan Hsu, Hsinchu County (TW); Chen-Feng Liu, Hsinchu (TW); Shun-Yong Huang, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 102 days.

(21) Appl. No.: 15/893,703

(22) Filed: Feb. 12, 2018

(65) Prior Publication Data
US 2018/0235011 A1 Aug. 16, 2018

Related U.S. Application Data

(60) Provisional application No. 62/458,586, filed on Feb. 14, 2017.

(51) Int. Cl.
| | | |
|---|---|---|
| *H04W 74/08* | (2009.01) | |
| *H04W 52/02* | (2009.01) | |
| *H04W 72/04* | (2009.01) | |
| *H04W 84/12* | (2009.01) | |

(52) U.S. Cl.
CPC ... *H04W 74/0816* (2013.01); *H04W 52/0216* (2013.01); *H04W 72/0493* (2013.01); *H04W 84/12* (2013.01); *Y02D 30/70* (2020.08)

(58) Field of Classification Search
CPC ......... H04W 74/0816; H04W 52/0216; H04W 72/0493; H04W 84/12; Y02D 70/142; Y02D 70/00; Y02D 70/144
USPC ....................................... 370/310, 328, 338
See application file for complete search history.

(56) References Cited

U.S. PATENT DOCUMENTS

| | | | |
|---|---|---|---|
| 2003/0012163 A1* | 1/2003 | Cafarelli | H04W 24/00 370/338 |
| 2010/0182986 A1* | 7/2010 | Okuike | H04W 56/00 370/338 |
| 2011/0170525 A1* | 7/2011 | Lee | H04W 74/0816 370/338 |
| 2014/0032951 A1* | 1/2014 | Garg | H04W 52/0216 713/323 |
| 2015/0139207 A1* | 5/2015 | Seok | H04W 48/14 370/338 |
| 2016/0262054 A1* | 9/2016 | Singh | H04W 74/0808 |
| 2016/0330788 A1* | 11/2016 | Zheng | H04W 28/0205 |

(Continued)

OTHER PUBLICATIONS

Rossi Jun Luo et al., OBSS NAV and PD Threshold Rule for Spatial Reuse, Sep. 13, 2015, IEEE 802.11-15/1109r0, pp. 1-20, XP068098351.

(Continued)

*Primary Examiner* — Obaidul Huq
(74) *Attorney, Agent, or Firm* — Winston Hsu

(57) ABSTRACT

A method of method of allocating a protection duration of a radio subsystem for a transmitting station of a wireless communication system includes transmitting a frame to at least one receiving station of the wireless communication system, wherein the proprietary frame indicates the protection duration allocated for the radio subsystem.

14 Claims, 4 Drawing Sheets

(56) References Cited

U.S. PATENT DOCUMENTS

2018/0317166 A1* 11/2018 Huang ................ H04W 48/20

OTHER PUBLICATIONS

Jing Ma et al., Considerations on MAC-PHY interactions during SR operations, Jul. 28, 2016, IEEE 802.11-16/0964r1, pp. 1-15, XP068107330.
Jing Ma, IEEE P802.11 Wireless LANs, Proposed Resolutions to CID 2665, 2719, Jul. 25, 2016, doc.: 11-16/1025r1, pp. 1-8, XP068107396.
Alfred Asterjadhi et al., LB 200 Comment Resolution for Clause 8.2.5, IEEE P802.11 Wireless LANs, doc.: IEEE 802.11-14/0038r1, Jan. 21, 2014, pp. 1-8, XP068118613.

* cited by examiner

METHOD OF ALLOCATING PROTECTION DURATION OF RADIO SUBSYSTEM TO INTRA-BSS STATIONS USING FRAMES WITH NETWORK ALLOCATION VECTOR

CROSS REFERENCE TO RELATED APPLICATIONS

This application claims the benefit of U.S. Provisional Application No. 62/458,586, filed on Feb. 14, 2017, the contents of which are incorporated herein.

BACKGROUND

In a wireless communication system complying with IEEE 802.11 standards, network allocation vector (NAV) is a timer mechanism that maintains a prediction of future traffics on a medium of the wireless communication system based on duration value information seen in previous frame transmission. The NAV may be thought of as a counter, which counts down to zero at a uniform rate. When the counter is nonzero, a station (STA) of the wireless communication system shall not access the medium because indication is busy.

Under coexistence scenario, e.g., in a wireless communication system capable of operating another radio subsystem (e.g., Bluetooth) than a current radio system (e.g., WIFI), a transmitting STA may send a frame with NAV protection to stop transmission from other STAs of interest (e.g., stations belong to a same basic service set (BSS), which is also known as intra-BSS STAs) when it is determined to yield a short time usage for another radio subsystem.

By this manner, it is more efficient than power saving mechanism to stop transmission from intra-BSS STAs as for a short time protection. However, it would cause reduction of channel utilization because any STAs including STAs not of interests (e.g., stations belong to another BSS, which is also known as inter-BSS STAs) that have listened to the frame with NAV protection shall update their NAV and stop transmission within another BSS.

SUMMARY

It is therefore an objective of the present invention to provide a method of allocating protection duration of radio subsystem to intra-BSS stations using frames with network allocation vector, to avoid inter-BSS stations from channel utilization reduction.

The present invention discloses a method of allocating a protection duration of a radio subsystem of a wireless communication system. A transmitting and receiving stations of the wireless communication system transmits and receives a frame to at least one receiving station of the wireless communication system, wherein the frame indicates the protection duration allocated for the radio subsystem.

The present invention utilizes the frame to prohibit intra-BSS stations from access the medium but allow the inter-BSS stations when it is determined to allocate protection duration for the radio subsystem. The frame indicates the protection duration and the BSSID (receiver address) that the transmitting station currently associated with, so the receiving station may update the NAV value according to the protection duration indicated by the frame if the receiver address indicated by the frame is matched with the BSSID of the receiving station; otherwise, the receiving station discards the frame. As a result, channel utilization reduction to any stations not of interest is avoided.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
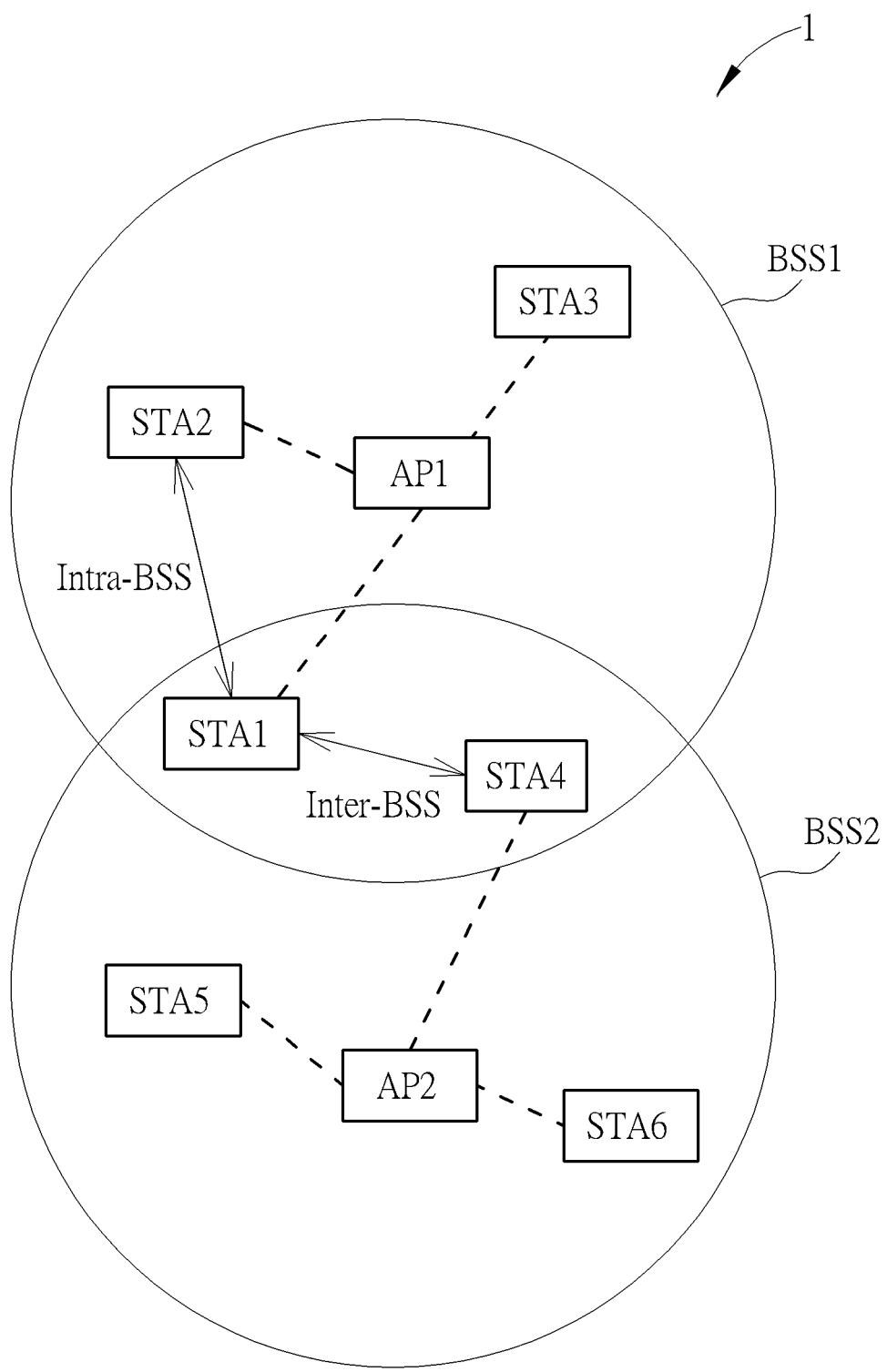
FIG. 1 illustrates a wireless communication system according to an embodiment of the present invention.

FIG. 1 illustrates a wireless communication system 1 according to an embodiment of the present invention. The wireless communication system 1 includes basic service sets BSS1 and BSS2. The basic service set BSS1 includes an access point AP1 and stations STA1-STA3, and the basic service set BSS2 includes an access point AP2 and stations STA4-STA6.

Note that stations associating with the same access point are regarded as intra-BSS stations, while stations associating with different access points are regarded as inter-BSS stations. For example, the stations STA1-STA3 accessing the access point AP1 are intra-BSS stations of the basic service set BSS1, and the stations STA4-STA6 accessing the access point AP2 are intra-BSS stations of the basic service set BSS2; while the stations STA1 and STA4 are inter-BSS stations because they access different access points AP1 and AP2, respectively.

Under coexistence scenario in the basic service set BSS1, given that either the access point AP1 or the station STA1 determines to yield a short time usage for a radio subsystem (e.g., Bluetooth) by sending a frame with network allocation vector (NAV) protection. Based on the existing IEEE 802.11 standards, the station STA4 being the inter-BSS station is prohibited from transmission since the station STA4 can hear the frame with NAV protection sent either by the access point AP1 or the station STA1. In such a situation, a channel allocated for the station STA4 to access the access point AP2 becomes idle, which leads channel utilization reduction to the basic service set BSS2.

To avoid channel utilization reduction, the present invention utilizes a frame to prohibit intra-BSS stations from accessing the medium but the inter-BSS stations are allowed when it is determined to allocate protection duration for the radio subsystem. Specifically, in an embodiment, Table 1 illustrates a "Duration/ID" field encoding rule of media access control (MAC) header format based on IEEE 802.11 standards.

TABLE 1

Duration/ID field encoding

| Bits 0-13 | Bit 14 | Bit 15 | Usage |
|---|---|---|---|
| 0-32767 | | 0 | Duration value (in microseconds) within all frames other than PS-POLL frames transmitted during the contention period (CP) and under Hybrid Coordination Function (HCF) for frames transmitted during the contention-free period (CFP) |
| 0 | 0 | 1 | Fixed value under point coordination function (PCF) within frames transmitted during the CFP |
| 1-16383 | 0 | 1 | Reserved |
| 0 | 1 | 1 | Reserved |
| 1-2007 | 1 | 1 | AID in PS-POLL frames |
| 2008-16383 | 1 | 1 | Reserved |

According to Table 1, the least significant bits 0-14 are used as a duration value within all frames other than PS-Poll (power-saving poll) frames if the most significant bit 15 is zero. In other words, the station does not update its NAV value based on the "Duration/ID" field of the MAC header if the PS-Poll frame is received because the "Duration/ID" field of the PS-Poll frame is used as an association identifier given by the associated medium.

In light of Table 1, the PS-Poll frame may be used as a proprietary frame that allows inter-BSS stations to access the medium by not updating their NAV values, but prohibits intra-BSS stations from accessing the medium by updating their NAV values based on the least significant bits 0-14 of the "Duration/ID" field of the MAC header.

In an embodiment, a proprietary frame is specified if a bit-15 of the "duration/ID" field of the MAC header of PS-Poll frame is zero, and the protection duration of the radio subsystem may be indicated by least significant bits 0-14 of the "Duration/ID" field of the MAC header of the PS-Poll frame.

When a mobile station wakes from a power-saving mode, it transmits a PS-Poll frame to the access point to retrieve frames buffered while it was in power-saving mode. Therefore, the "BSSID" (basic service set identifier) field of the MAC header of the PS-Poll frame is set to the receiver address (RA) of their belonging basic service set, namely, the address of the access point that the transmitting station is currently associated with.

Note that the inter-BSS and intra-BSS stations are specified according to the BSSID of their belonging basic service set, so the receiving stations recognize themselves as either the inter-BSS station or the intra-BSS station according to the BSSID indicated by the PS-Poll frame.

In an embodiment, the transmitting station may indicate its BSSID in the PS-Poll frame according to "From DS" (Distribution System) field and "To DS" field of the MAC header by the following rules: if From DS=1 and To DS=0, then TA=BSSID; or if From DS=0 and To DS=1, then RA=BSSID. The condition "From DS=1 and To DS=0" refers to the situation that the transmitted frames are coming from the distribution system (e.g., the access point) to the mobile station, so the transmitter address (TA) is set with the BSSID. While the condition "From DS=0 and To DS=1" refers to the situation that the transmitted frames are coming from the mobile station to the distribution system, so the receiver address is set with the BSSID.

Therefore, when the PS-Poll frame is used as a proprietary frame, the receiving stations that have listened to the proprietary frame may know if they are of interest according to the BSSID and the "RA" field of the MAC header of the proprietary frame. In an embodiment, when the proprietary frame is received, the intra-BSS stations may update their NAV values according to the protection duration indicated by the proprietary frame and stop accessing the medium until the NAV counts down to zero if the receiver address indicated by the proprietary frame matches with the BSSID of their belonging BSS. On the other hand, when the proprietary frame is received, the inter-BSS stations may discard the proprietary frame if the receiver address indicated by the proprietary frame does not match with the BSSID of their belonging BSS, which avoids channel utilization reduction to the inter-BSS stations.

Note that the transmitting station may transmit at least one of a beacon, probe response, and association frames to indicate the capability of the radio subsystem before transmitting the proprietary frame. Therefore, the transmission of any station not of interest and complying with existing IEEE 802.11 standards is not influenced by the proprietary frame because the proprietary frame is as a regular PS-Poll frame to be discarded, which avoids channel utilization reduction to stations not of interest.

Figure 2:
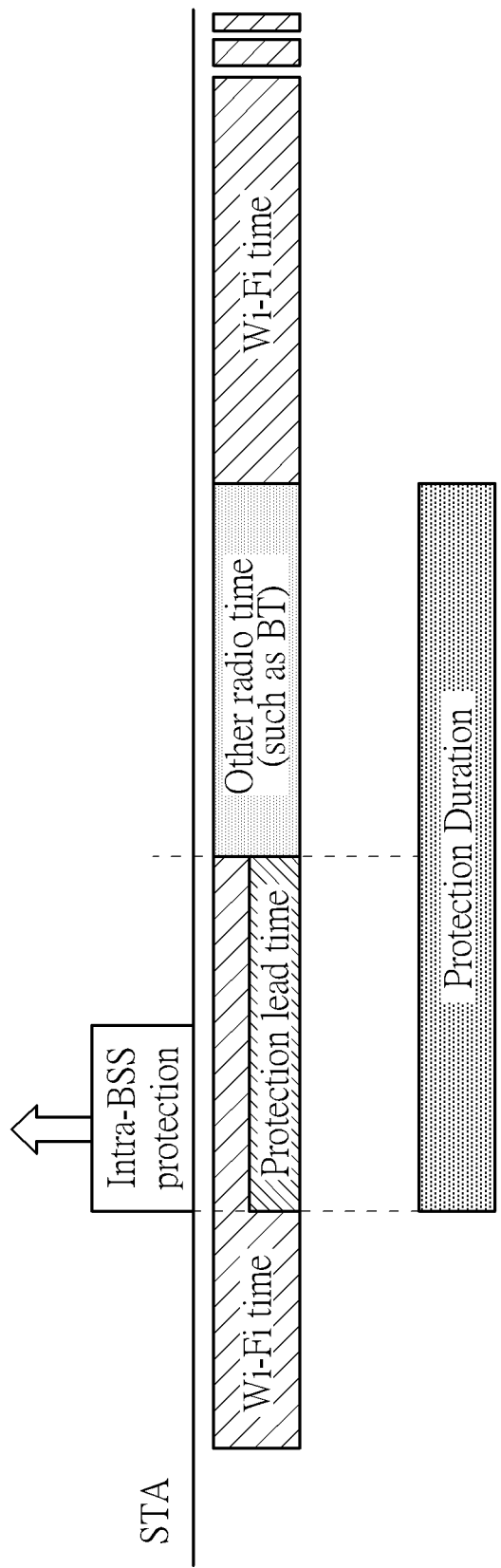
FIG. 2 illustrates a transmission time slot according to an embodiment of the present invention.

FIG. 2 illustrates a transmission time slot according to an embodiment of the present invention. Under coexistence scenario in the basic service set BSS1, given that either the access point AP1 or the station STA1 determines to yield a short time usage for a radio subsystem (e.g., Bluetooth) from a current radio system (e.g., WIFI). Either the access point AP1 or the station STA1 transmits a frame, wherein the frame indicates the protection duration allocated for the radio subsystem, and the protection duration includes a protection lead time and a radio subsystem operating time. The frame can be a proprietary frame or a frame defined by the standard.

The access point AP1 and the station STA1 may switch from the current radio system operation to the radio subsystem operation during the protection lead time, and then the access point AP1 and the station STA1 may perform radio subsystem operation during the radio subsystem operating time. Meanwhile, the intra-BSS stations STA2 and STA3 that have listened to the proprietary frame are prohibited from accessing the access point AP1 by updating their NAV values according to the protection duration indicated by the proprietary frame. While the inter-BSS station STA4 or any stations not of interest (e.g., the access point AP2, and the stations STA5 and STA6) may discard the proprietary frame. As a result, channel utilization reduction to any stations not of interest is avoided.

Figure 3:
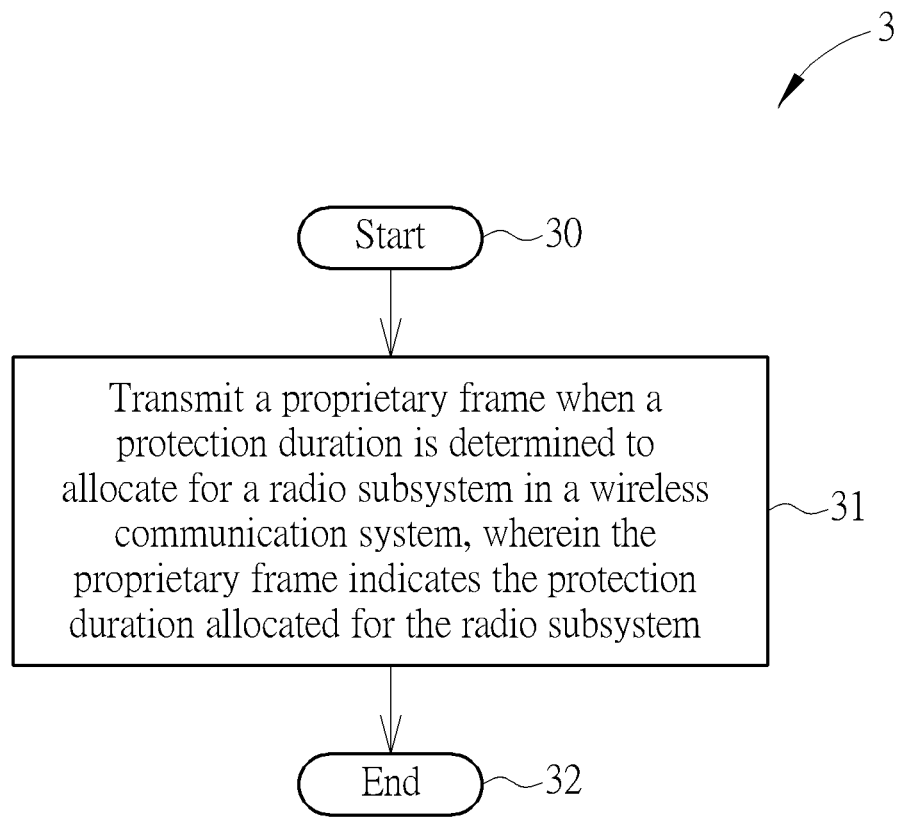
FIG. 3 is a flowchart of a process of protection duration allocation for radio subsystem using intra-BSS protection frames for a transmitting station according to an embodiment of the present invention.

FIG. 3 is a flowchart of a process 3 of allocating protection duration of radio subsystem to intra-BSS stations using frames according to an embodiment of the present invention. The frames can be proprietary frames or frames defined by the standard. The process 3 is utilized for a transmitting station which may be either a mobile station or an access point of a basic service set of a wireless communication system that prohibits intra-BSS stations from accessing the medium but allows the inter-BSS stations, which avoids the inter-BSS stations from channel utilization reduction. The process 3 includes the following steps.

Step 30: Start.

Step 31: Transmit a proprietary frame when a protection duration is determined to allocate for a radio subsystem in a wireless communication system, wherein the proprietary frame indicates the protection duration allocated for the radio subsystem.

Step 32: End.

According to the process 3, the transmitting station transmits the proprietary frame when the protection duration is determined to allocate for the radio subsystem from the radio system in the wireless communication system, wherein the proprietary frame indicates the protection duration for the radio subsystem. Detailed description regarding the process 3 may be obtained by referring to description regarding FIG. 1 and FIG. 2.

Figure 4:
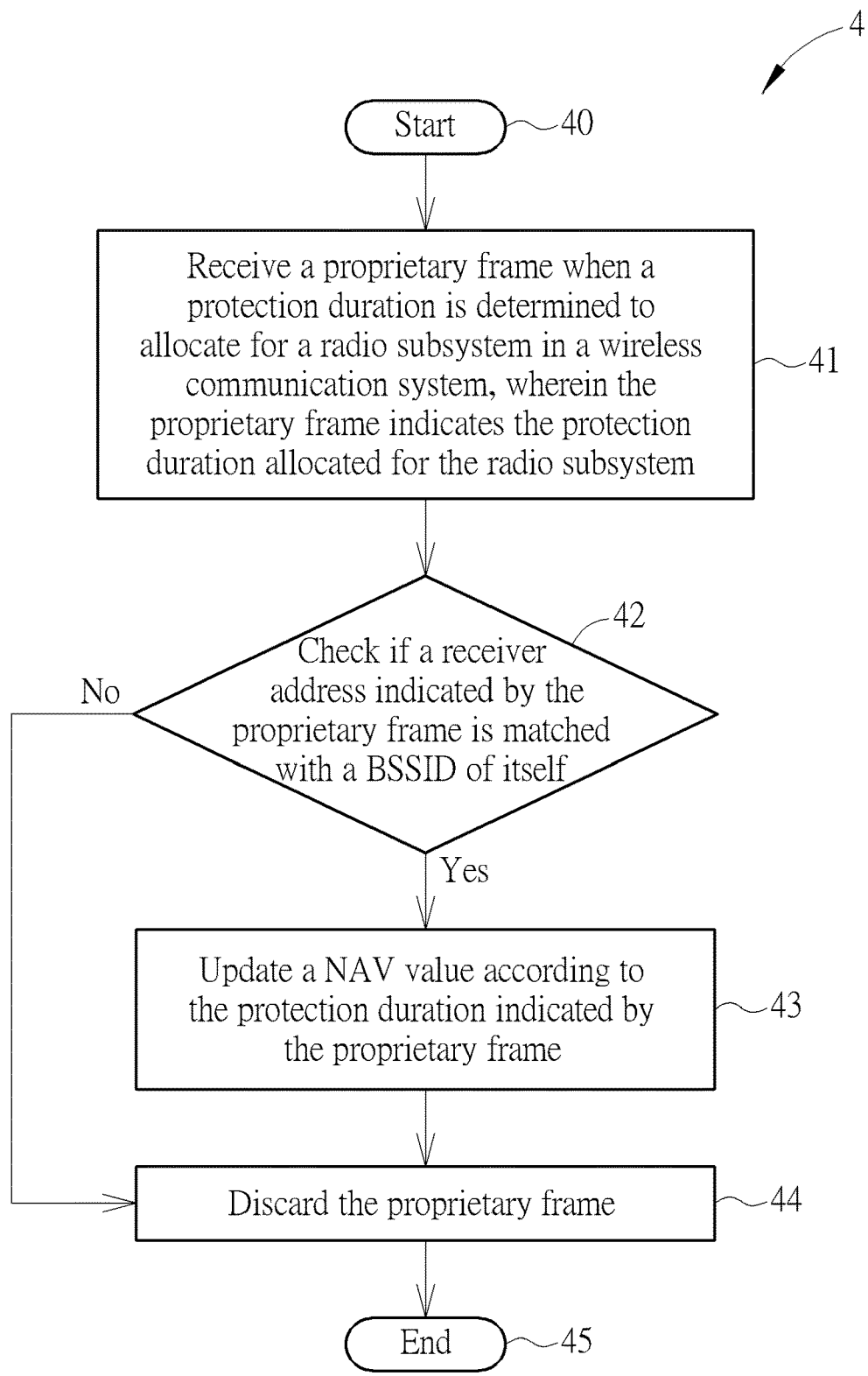
FIG. 4 is a flowchart of a process of protection duration allocation for radio subsystem using intra-BSS protection frames for a receiving station according to an embodiment of the present invention.

FIG. 4 is a flowchart of a process 4 of allocating protection duration of radio subsystem to intra-BSS stations using proprietary frames according to an embodiment of the present invention. The process 4 is utilized for a receiving station which may be either a mobile station or an access point of a basic service set of a wireless communication system that prohibits intra-BSS stations from accessing the medium but allows the inter-BSS stations, which avoids the inter-BSS stations from channel utilization reduction. The process 4 includes the following steps.

Step 40: Start.

Step 41: Receive a proprietary frame when a protection duration is determined to allocate for a radio subsystem in a wireless communication system, wherein the proprietary frame indicates the protection duration allocated for the radio subsystem.

Step 42: Check if a receiver address indicated by the proprietary frame is matched with a BSSID of itself. Go to Step 403 if yes; or go to Step 404 if no.

Step 43: Updating a NAV value according to the protection duration indicated by the proprietary frame. End.

Step 44: Discard the proprietary frame.

Step 45: End.

According to the process 4, the receiving station receives the proprietary frame when the protection duration is determined to allocate for the radio subsystem from the radio system in the wireless communication system, wherein the proprietary frame indicates the protection duration for the radio subsystem. The receiving station updates the NAV value according to the protection duration indicated by the proprietary frame if the receiver address indicated by the proprietary frame is matched with the BSSID of itself; otherwise, the receiving station discards the proprietary frame. Detailed description regarding the process 4 may be obtained by referring to description regarding FIG. 1 and FIG. 2.

Furthermore, in an embodiment, it is feasible to modify the current IEEE 802.11 standards to include specification of inter-BSS protection frames. For example, adding new MAC frame format for the inter-BSS protection frames. In another example, defining new PHY SIG (physical signal) fields, or including protection duration and inter-BSS indication, wherein payload of the inter-BSS protection frames may be omitted and reusing inter-BSS indication such as "BSS color" field specified in IEEE 802.11ax standards. The "BSS color" field is an identifier of the BSS in which the corresponding frame is transmitted. All stations within hearing distance of the frame preamble read BSS color during the carrier sense process. They can thus identify the BSS of the frame transmission. For example, the proprietary frame is regarded as an intra-BSS frame if the BSSID indicated by the "BSS color" field is the same as the BSSID of the receiving station, or the proprietary frame is regarded as an inter-BSS frame if the BSSID indicated by the "BSS color" field is different from the BSSID of the receiving station.

To sum up, the present invention utilizes the frame to prohibit intra-BSS stations from access the medium but allow the inter-BSS stations when it is determined to allocate protection duration for the radio subsystem. The frame can be a proprietary frame or a frame defined by the standard. The frame indicates the protection duration and the BSSID (receiver address) that the transmitting station currently associated with, so the receiving station may update the NAV value according to the protection duration indicated by the frame if the receiver address indicated by the frame is matched with the BSSID of the receiving station; otherwise, the receiving station discards the frame. As a result, channel utilization reduction to any stations not of interest is avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of allocating a protection duration of a radio subsystem for a transmitting station of a wireless communication system, comprising:
transmitting a frame to at least one receiving station of the wireless communication system, wherein the frame indicates the protection duration allocated for the radio subsystem;
wherein the frame is a proprietary frame and is specified if a bit-15 of a "duration/ID" field of a media access control (MAC) header of a power saving poll (PS-Poll) frame is zero.

2. The method of claim 1, further comprising:
transmitting at least one of a beacon, probe response, and association frames to the at least one receiving station to indicate a capability of operating the radio subsystem, wherein the capability is indicated by a vendor specific information element of the at least one of the beacon, probe response, and association frames.

3. The method of claim 1, wherein the protection duration of the radio subsystem is indicated by least significant bits 0-14 of the "Duration/ID" field of the MAC header of the PS-Poll frame.

4. The method of claim 1, wherein the proprietary frame indicates a basic service set identifier (BSSID) of the transmitting station, a transmitter address indicated by the proprietary frame is set with the BSSID if "From DS" (Distribution System) field and "To DS" field of the MAC header of the PS-Poll frame are respectively one and zero, and a receiver address indicated by the proprietary frame is set with the BSSID the transmitting station if the "From DS" and "To DS" fields of the MAC header of the PS-Poll frame are respectively zero and one.

5. The method of claim 1, wherein the protection duration includes a protection lead time and an operating time.

6. The method of claim 1, wherein the frame is an intra-BSS frame if a BSSID of the transmitting station indicated by a "BSS color" field of the frame is same as a BSSID of the receiving station, or the frame is an inter-BSS frame if the BSSID of the transmitting station indicated by the "BSS color" field is different from the BSSID of the receiving station.

7. A method of allocating a protection duration of a radio subsystem for a receiving station of a wireless communication system, comprising:

receiving a frame from a transmitting station of the wireless communication system, wherein the frame indicates the protection duration allocated for the radio subsystem;

wherein the frame is a proprietary frame and is specified if a bit-15 of a "duration/ID" field of a media access control (MAC) header of a power saving poll (PS-Poll) frame is zero.

8. The method of claim 7, further comprising:

transmitting at least one of a beacon, probe response, and association frames to the at least one receiving station to indicate a capability of operating the radio subsystem, wherein the capability is indicated by a vendor specific information element of the at least one of the beacon, probe response, and association frames.

9. The method of claim 7, wherein the protection duration of the radio subsystem is indicated by least significant bits 0-14 of the "Duration/ID" field of the MAC header of the PS-Poll frame.

10. The method of claim 7, wherein the proprietary frame indicates a basic service set identifier (BSSID) of the transmitting station, a transmitter address indicated by the proprietary frame is set with the BSSID if "From DS" (Distribution System) field and "To DS" field of the MAC header of the PS-Poll frame are respectively one and zero, and a receiver address indicated by the proprietary frame is set with the BSSID the transmitting station if the "From DS" and "To DS" fields of the MAC header of the PS-Poll frame are respectively zero and one.

11. The method of claim 7, further comprising:

updating a network allocate vector value according to the protection duration indicated by the proprietary frame if a BSSID of the receiving station is same as the BSSID of the transmitting station indicated by the proprietary frame; or discarding the proprietary frame if the BSSID of the receiving station is different from the BSSID of the transmitting station indicated by the proprietary frame.

12. The method of claim 7, wherein the protection duration includes a protection lead time and an operating time.

13. The method of claim 7, wherein the frame is an intra-BSS frame if a BSSID of the transmitting station indicated by a "BSS color" field of the frame is same as a BSSID of the receiving station, or the frame is an inter-BSS frame if the BSSID of the transmitting station indicated by the "BSS color" field is different from the BSSID of the receiving station.

14. The method of claim 13, further comprising:

updating a network allocate vector value according to the protection duration indicated by the frame if the frame is the intra-BSS frame; or discarding the frame if the frame is the inter-BSS frame.

* * * * *